United States Patent [19]

Mar et al.

[11] 4,131,593

[45] Dec. 26, 1978

[54] LOW INFRARED EMISSIVITY PAINTS COMPRISING AN OXIME CURED SILICONE BINDER

[75] Inventors: Henry Y. B. Mar, Arden Hills; Paul B. Zimmer, New Brighton, both of Minn.

[73] Assignee: The United States of America as represented by the Secretary of the Air Force, Washington, D.C.

[21] Appl. No.: 841,777

[22] Filed: Oct. 13, 1977

Related U.S. Application Data

[63] Continuation-in-part of Ser. No. 706,047, Jul. 19, 1976, abandoned.

[51] Int. Cl.$^2$ ............................................... C08L 83/04
[52] U.S. Cl. ................................ 260/37 SB; 428/447
[58] Field of Search .................................... 260/37 SB

[56] References Cited

U.S. PATENT DOCUMENTS

| 2,776,898 | 1/1957 | Day et al. | 106/39 |
| 3,812,164 | 5/1974 | Schulz et al. | 260/37 SB |
| 3,910,797 | 10/1975 | Beers | 260/37 SB |

*Primary Examiner*—Leland A. Sebastian
*Attorney, Agent, or Firm*—Joseph E. Rusz; William J. O'Brien

[57] ABSTRACT

A low infrared emissivity paint composition for use in coating applications requiring nuclear flash protection. The paint comprises a mixture of a pigment material such as $Ta_2O_5$, $BaTiO_3$, $CdS$, $Sb_2S_3$, $CoTiO_3$ or CdSe and an oxime cured silicone binder material.

2 Claims, 1 Drawing Figure

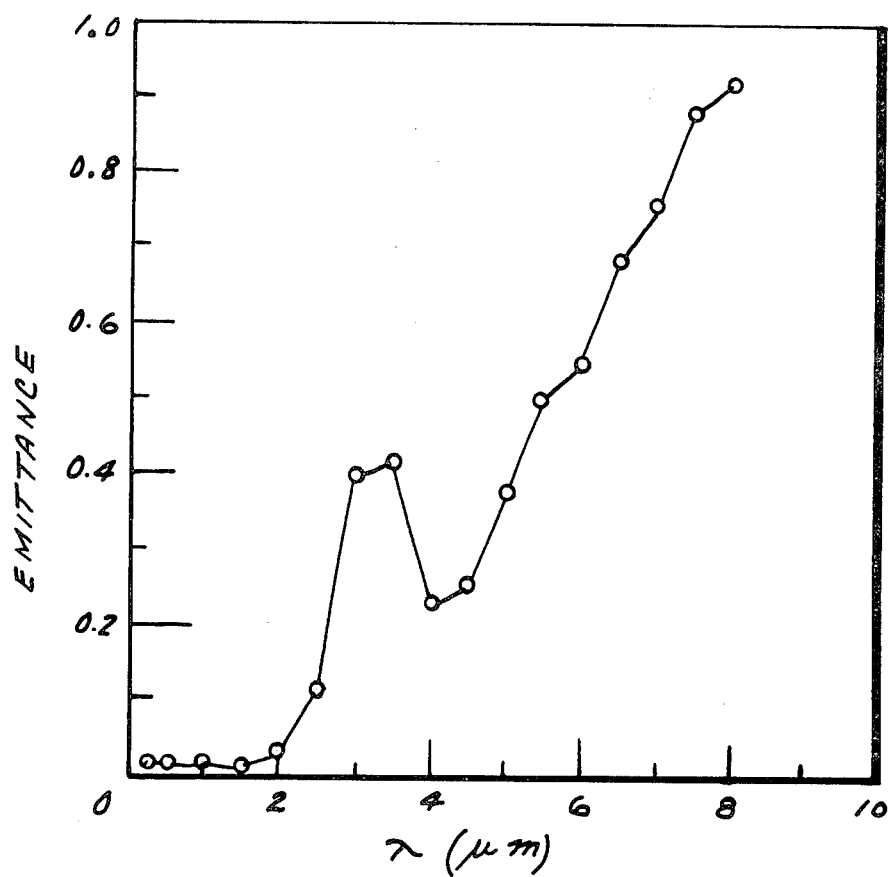

LOW INFRARED EMISSIVITY PAINTS COMPRISING AN OXIME CURED SILICONE BINDER

STATEMENT OF GOVERNMENT INTEREST

The invention described herein may be manufactured and used by or for the Government for governmental purposes without the payment of any royalty thereon.

CROSS REFERENCE TO RELATED APPLICATION

This application is a continuation-in-part of U.S. patent application Ser. No. 706,047, filed 19 July 1976, now abandoned.

BACKGROUND OF THE INVENTION

This invention relates to a paint coating and to a method for its manufacture. More particularly, this invention concerns itself with a paint coating that is characterized by a low infrared emissivity.

At the present time, there is a real need for coating compositions that can be utilized as a protective medium against the harmful effects of a nuclear explosion. Considerable research, therefore, has been conducted in an attempt to develop paint compositions suitable for use in applications requiring nuclear flash protection, diffuse low infrared emittance, visual camouflage, thermal control and long term high temperature resistance on metals and plastics for interior and exterior use.

Conventional paints show low emittance to about 2 $\mu$m while the low emissivity infrared paints show low emittance to about 5 $\mu$m. Test panels coated with a convention paint (for example (MIL-C-83286 polyurethane) and exposed to a 20 cal/cm$^2$ sec quartz lamp bank (simulated nuclear flash) will reach a back face temperature of 650° F. in 2-3 seconds. Under the same conditions, however, the low infrared emissivity paint of this invention requires 7 to 10 seconds to reach a back face temperature of 650° F. The paint coatings covered by this invention cure to full properties at room temperature. They consist of high purity pigments which are transparent in the infrared such as BaTiO$_3$, and a class of binders referred to as oxime cured silicones. These materials when milled under non-contaminating conditions provide paints with the above mentioned unique properties.

SUMMARY OF THE INVENTION

In accordance with this invention, it has been found that a unique family of paint coatings possess the necessary low infrared emissivity that permits their use in coating applications requiring nuclear flash protection, thermal control and long term high temperature resistance for both interior and exterior use. The paints of this invention consist essentially of a pigment material selected from the group consisting of Ta$_2$O$_5$, Ba TiO$_3$, CdS, Sb$_2$S$_3$, Cd Se, CoTiO$_3$, and a binder material referred to as oxime cured silicone. Mixtures of the pigment material referred to heretofore, also may be utilized.

Accordingly, the primary object of this invention is to provide a low infrared emissivity paint.

Another object of this invention is to provide a paint coating that finds use in applications requiring nuclear flash protection, thermal control and long term high temperature resistance.

Still another object of this invention is to provide a paint coating that exhibits a more extended range of low infrared emittance and a higher resistance to simulated nuclear flash with coatings of various colors than was previously obtained with white coatings.

The above and still other objects and advantages of the present invention will become more readily apparent upon consideration of the following detailed disclosure thereof when taken in conjunction with the accompanying drawing.

DESCRIPTION OF THE DRAWING

The FIGURE in the drawing represents a graphical illustration showing the low diffuse emittance of the paint coatings of this invention.

DESCRIPTION OF THE PREFERRED EMBODIMENT

With the above-mentioned and other objects of mind, the present invention contemplates new and improved low infrared emissivity paints and a process for their manufacture. These paints consist essentially of a pigment such as Ta$_2$O$_5$, BaTiO$_3$, CdS, CdSe, Sb$_2$S$_3$, CoTiO$_3$ or mixture thereof, and a class of binders referred to as oxime cured silicones.

The Oxime cured silicones are more particularly described in U.S. Pat. No. 3,189,576 issued on 15 June 1965.

The unique optical properties of this family of paint coatings is partially the result of an unusual phenomena which takes place as the coating cures. During cure, the paint binder shrinks causing protrusion of pigment particles on the paint surface. This reduces the amount of binders around each particle resulting in diffuse and lower infrared emittance than conventional binders could provide. In addition, the low infrared emittance characteristics are enhanced by the use of high purity (>99%) pigment and a pigment particle size (0.5-15 $\mu$m) larger than used in conventional paints.

The process used to prepare the paint coatings of this invention consists of the following sequence of events. A typical white paint coating is discussed, but the process applies equally well to colored paint coatings.

First, a high purity pigment, such as BaTiO$_3$, is vacuum baked for 16 hours minimum at 250° F. to remove residual water. The vacuum needed should be 4 mm or better. Removal of water is important for two reasons: (a) water catalyzes the oxime silicone binder and if not removed would render the paint a solid mass in a few days; (b) water absorbs strongly at 2.8 $\mu$m, and is therefore detrimental to coatings which are designed for low emittance in that region. After vacuum baking, the pigment is allowed to cool in a dry environment such as a desiccater until it reaches ambient temperature. Cooling in the presence of moisture would result in adsorption of it on the pigment particles which is objectional for reasons stated above.

Next, an equal amount in weight of an oxime cured silicone binder system such as the fluid, end-blocked dimethylpolysiloxane systems, described in examples 1, 2, 4, 6 or 11 of U.S. Pat. No. 3,189,576, issued 15 June 1965, is combined with an equal quantity by weight of pigment in a mill which will not contaminate (the contaminants of concern are those that increase the low infrared emittance) the paint. The amount of pigment used depends on the application. However, equal amounts of pigment and binder have been found acceptable. In general, higher pigment loading yields lower infrared emittance. Polyethylene lined mills provide the container with which this may be accomplished, but other lining materials such as polypropylene, polytetrafluoroethylene, or polychlorotrifluorethylene could also be used. High density and high hardness grinding media such as theose known as Diamonite should be used to prevent excessive contamination due to the grinding media. The volume of the mill, the volume of the grinding media, the volume of the paint mixture, and speed of milling are important. The paint mixture and grinding media should fill approximately half the volume of the mill. The paint mixture should just cover the top of the grinding media.

The speed of rotation of the mill should be maintained at 50-60% of the critical speed which is given by the formula;

$$S_c = 300/r$$

where
$S_c$ is the critical speed
r is the radius of the mill in centimeters.

The milling time should be maintained at 2-3 hours.

The above parameters essentially optimize the milling operation. Without optimization, excessive milling time is required which causes excessive pigment particle size reduction and increased mill contamination which in turn results in higher infrared emittance. The paint should be transferred from the mill to storage containers under dry conditions to avoid premature catalysis of the oxime silicone. Reduction of the viscosity of the paint coating is accomplished with xylene to a Zahn No. 2 cup of 18-20 seconds.

The paint coatings of this invention are generally applied to surfaces which have been primed with an epoxy primer to a dry film thickness of between 2-3 mils in two passes of the spray gun. The paint cures to provide good handling properties in 24 hours and optimum properties in 5-7 days at room temperature. Heat accelerates the cure to reduce the wait time to a few hours. The paint appears identical to conventional lustreless (matte) paint coatings in the visible portion of the spectrum. However, the coatings have uniquely low diffuse emittance in the 1-5 μm region of the infrared spectrum, as can be seen by referring to the figure in the drawing, together with hich nuclear flash resistance. These features coupled with their high temperature resistance (greater than 400° F. continuous) and good weatherability set the materials apart from conventional paint coatings.

While the principle of the present invention has been described with particularity, it should be understood that various alterations and modifications can be made without departing from the spirit of the invention, the scope of which is defined by the appended claims.

What is claimed is:

1. A low infrared emissivity coating composition particularly adapted to provide nuclear flash protection which comprises a mixture in equal amounts of (a) a pigment material selected from the group consisting of $Ta_2O_5$, $BaTiO_3$, $CdS$, $Sb_2S_3$. $CoTiO_3$, $CdSe$ and mixtures thereof; and (b) an oxime cured silicone binder material.

2. A low infrared emissivity coating composition in accordance with claim 1 wherein said pigment is $BaTiO_3$.